Figure 3:
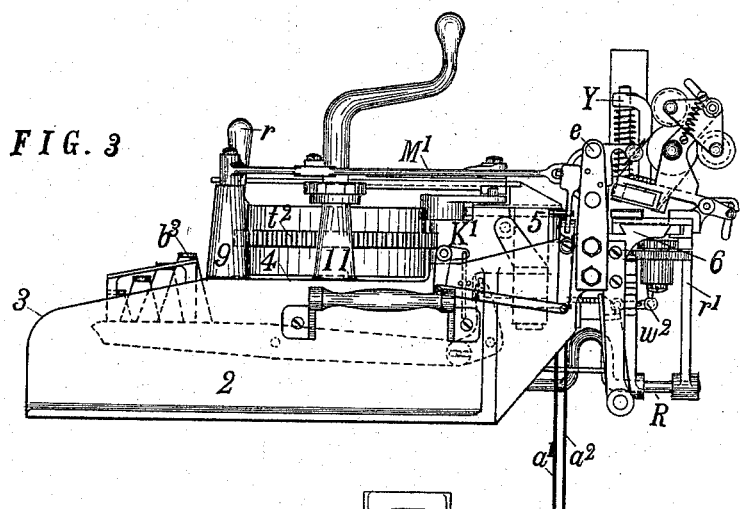

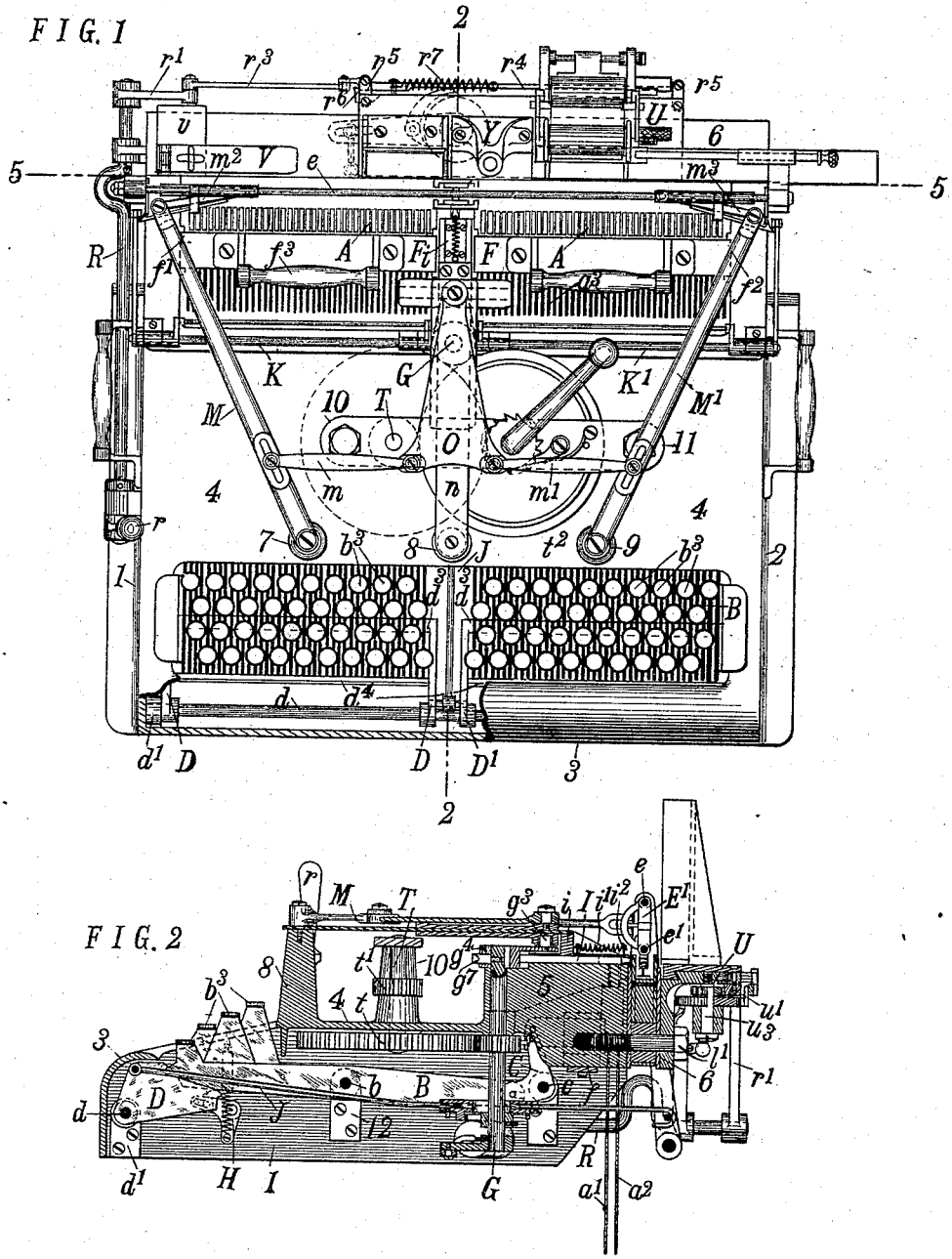

(No Model.) 7 Sheets—Sheet 2.
C. SEARS & F. MILLER.
MATRIX MAKING MACHINE.

No. 537,905. Patented Apr. 23, 1895.

WITNESSES.

INVENTORS
Charles Sears
Frank Miller
By Wing & Thurston
their attorneys (No Model.)　　　　　　　　　　　　　　　　　　　　7 Sheets—Sheet 3.
C. SEARS & F. MILLER.
MATRIX MAKING MACHINE.
No. 537,905.　　　　　　　　　　　　　Patented Apr. 23, 1895.
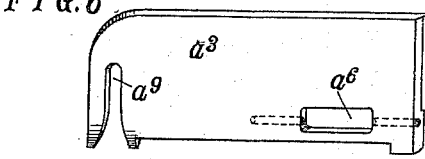
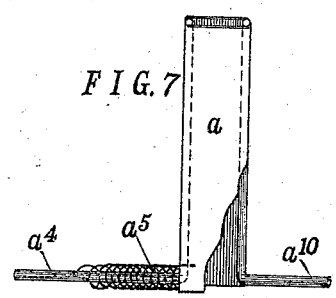
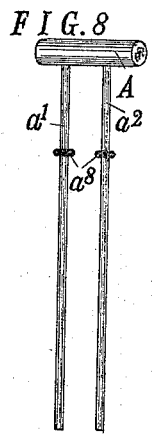
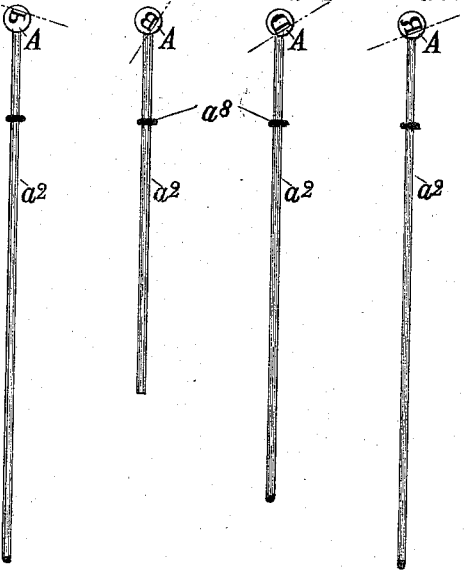
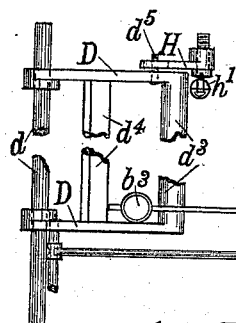
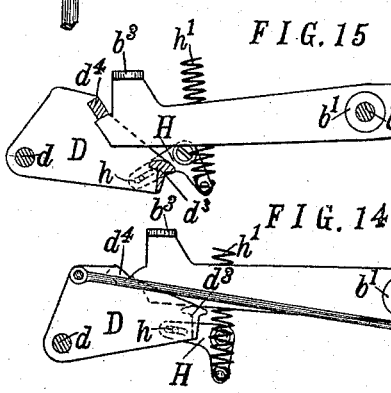
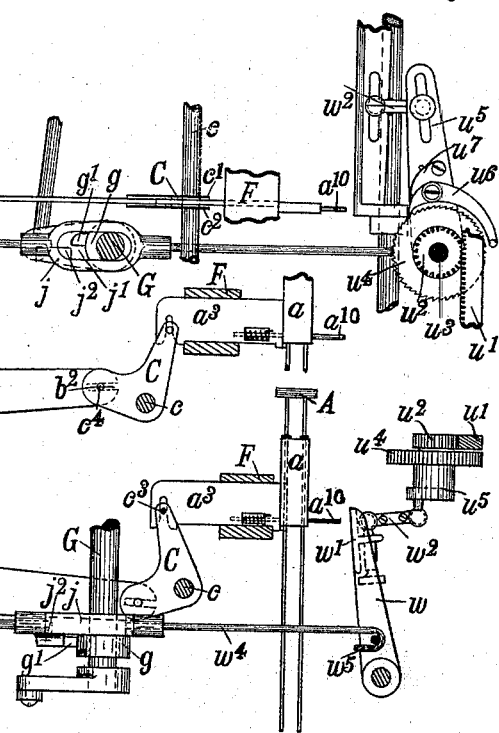
WITNESSES.　　　　　　　　　　　　　　　　INVENTORS
　F. Griswold　　　　　　　　　　　　　　　　Charles Sears
　B. Woolley.　　　　　　　　　　　　　　　　Frank Miller
　　　　　　　　　　　　　　　　　　By Wing & Thurston
　　　　　　　　　　　　　　　　　　their attorneys (No Model.) 7 Sheets—Sheet 4.
C. SEARS & F. MILLER.
MATRIX MAKING MACHINE.
No. 537,905. Patented Apr. 23, 1895.
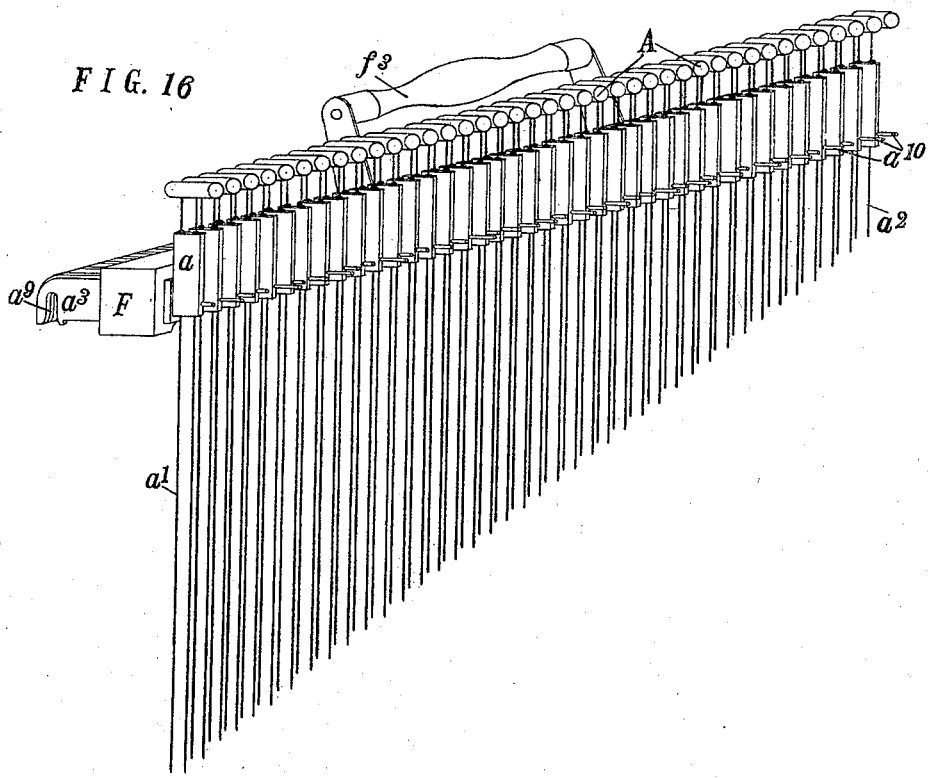
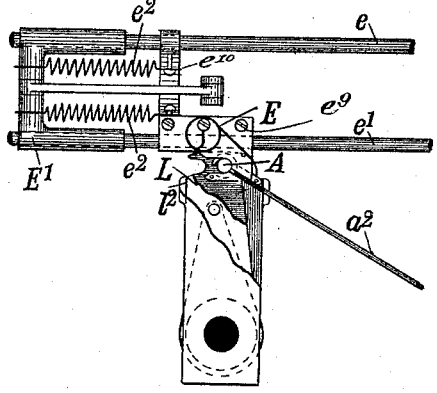
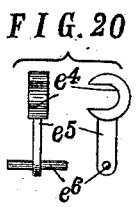
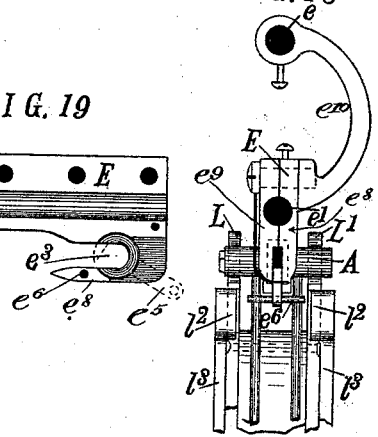
WITNESSES.
F. F. Griswold
B. Woolley.
INVENTORS
Charles Sears
Frank Miller
By Wing & Thurston
their attorneys (No Model.)  
C. SEARS & F. MILLER.  
MATRIX MAKING MACHINE.  
No. 537,905.  
Patented Apr. 23, 1895.  
7 Sheets—Sheet 5.
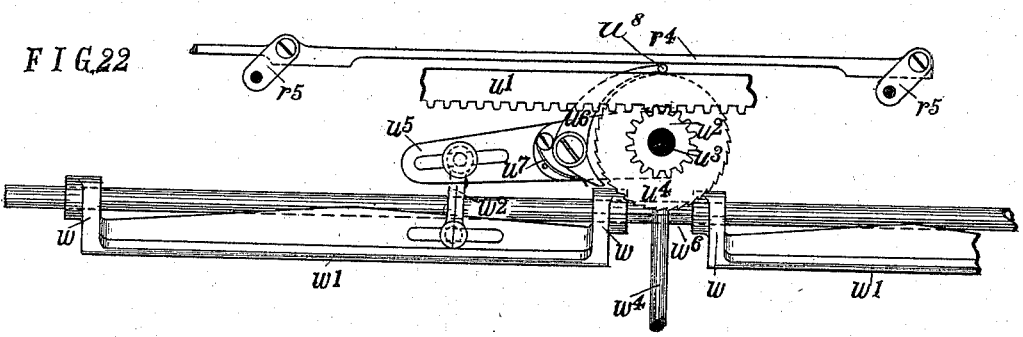
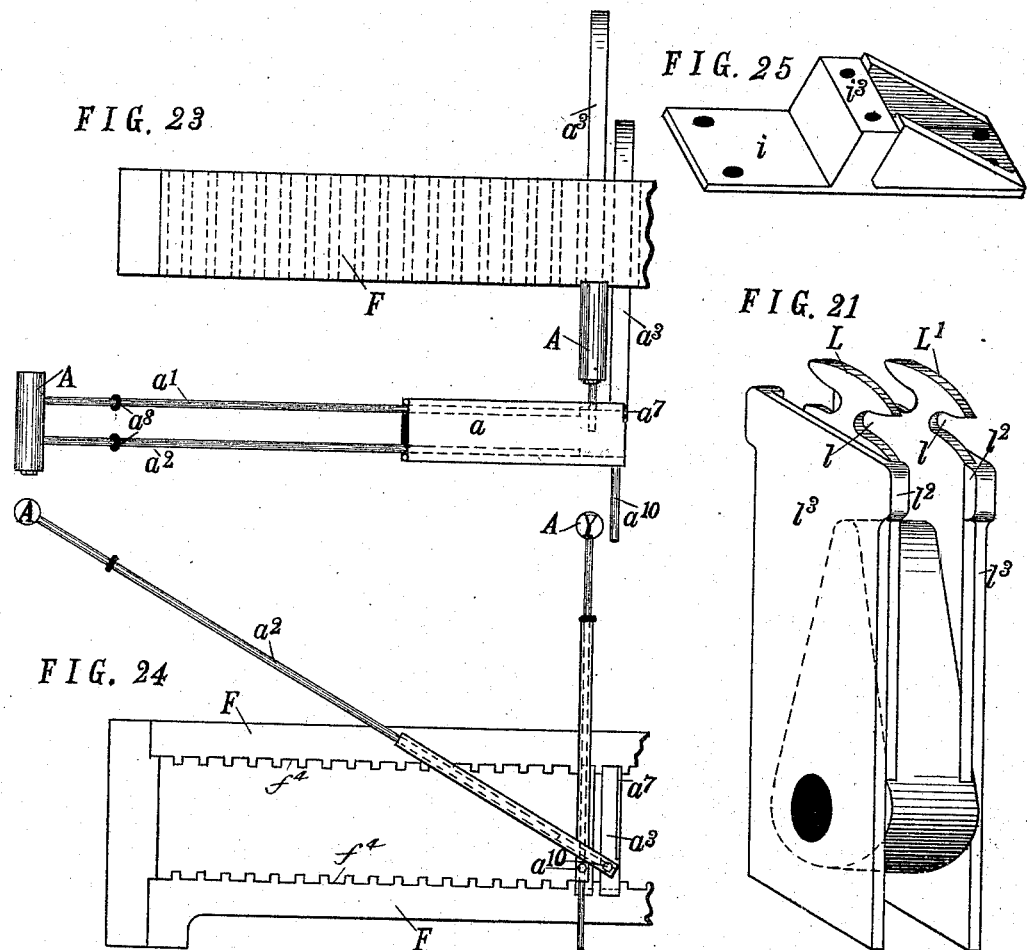

(No Model.) 7 Sheets—Sheet 6.
C. SEARS & F. MILLER.
MATRIX MAKING MACHINE.
No. 537,905. Patented Apr. 23, 1895.
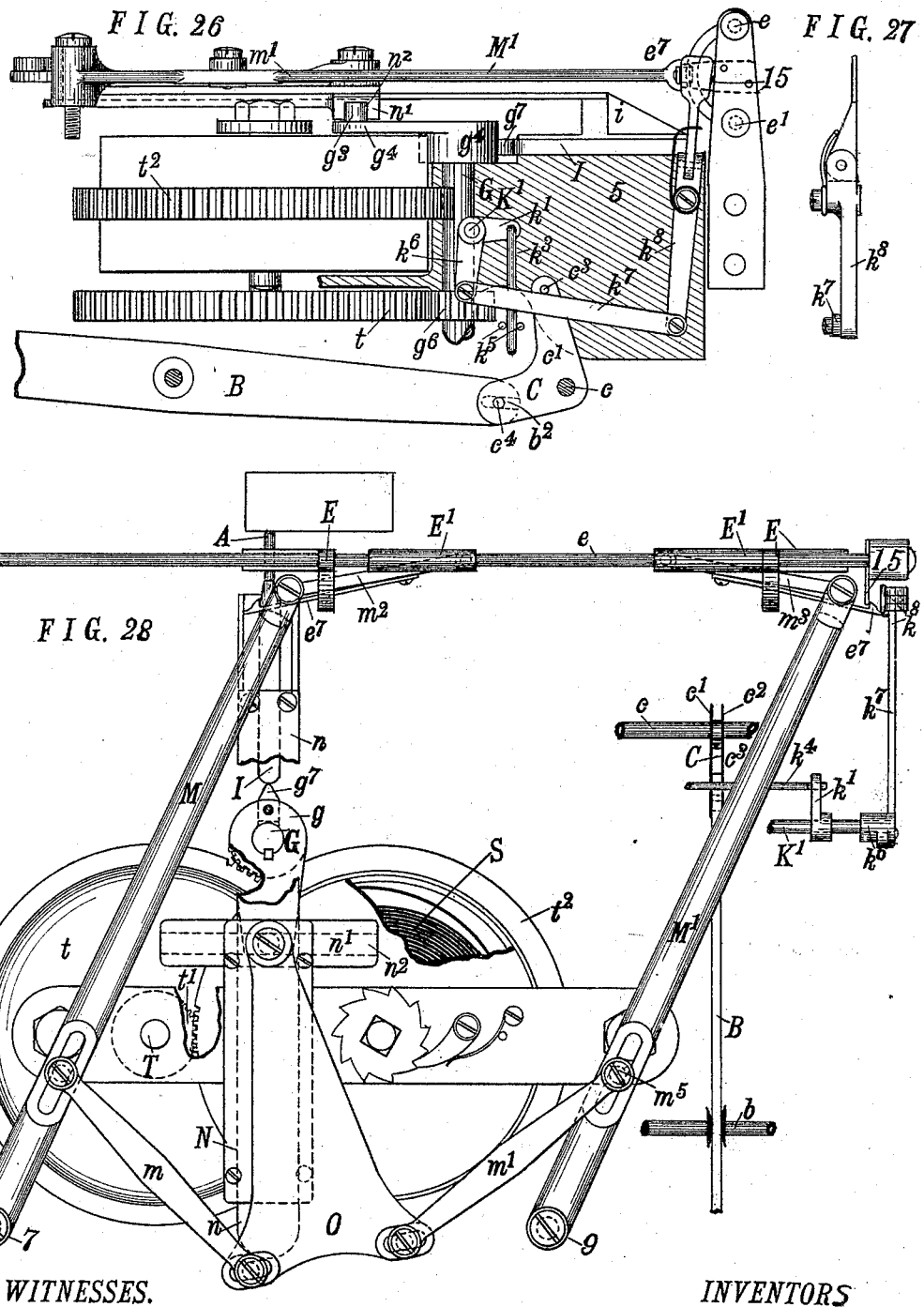
WITNESSES.
H. Griswold
B. Woolley.
INVENTORS
Charles Sears
Frank Miller
By Wing & Thurston
their attorneys (No Model.) 7 Sheets—Sheet 7.
C. SEARS & F. MILLER.
MATRIX MAKING MACHINE.
No. 537,905. Patented Apr. 23, 1895.
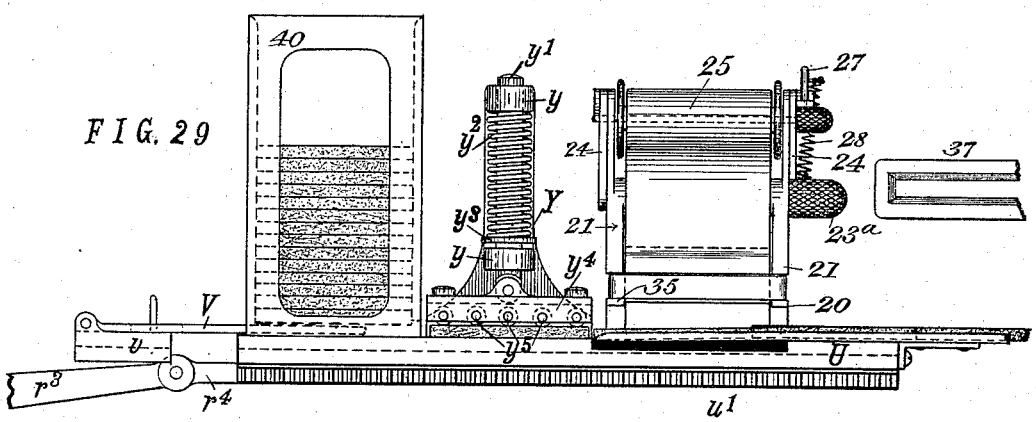
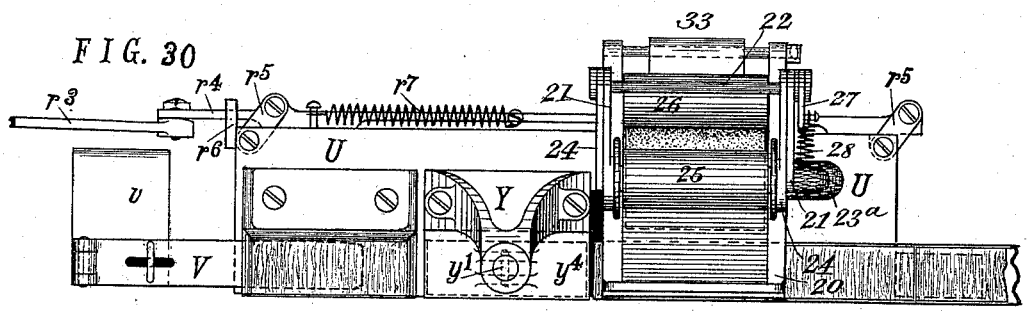
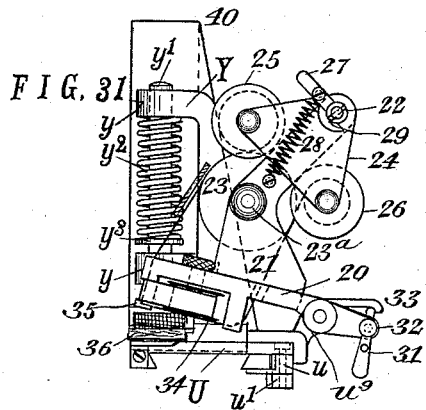
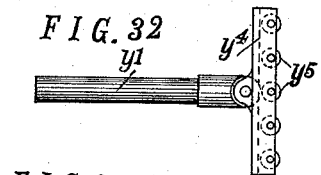
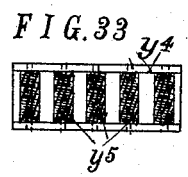
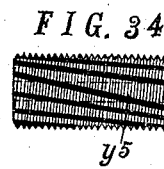
WITNESSES.
F. Griswold
B. Woolley
INVENTORS
Charles Sears
Frank Miller
By Wing & Thurston
their attorneys

UNITED STATES PATENT OFFICE.

CHARLES SEARS AND FRANK MILLER, OF CLEVELAND, OHIO; SAID MILLER ASSIGNOR TO SAID SEARS.

MATRIX-MAKING MACHINE.

SPECIFICATION forming part of Letters Patent No. 537,905, dated April 23, 1895.

Application filed May 27, 1893. Serial No. 475,680. (No model.)

*To all whom it may concern:*

Be it known that we, CHARLES SEARS and FRANK MILLER, citizens of the United States, residing at Cleveland, in the county of Cuyahoga and State of Ohio, have invented certain new and useful Improvements in Matrix-Making Machines; and we do hereby declare the following to be a full, clear, and exact description of the invention, such as will enable others skilled in the art to which it appertains to make and use the same.

Our invention relates to the class of machines of which the primary purpose is to impress, one by one, into suitable material the letters and characters which it is desired to have appear in a line of printed matter, thereby forming a mold from which a linotype may be cast.

Our improvements have to do principally with the construction of the dies, and the means for supporting them in the machine in such manner that they are severally capable of being brought to the impression point; to the mechanism for moving the dies severally to and from the impression point; to the mechanism for imparting to the impression receiving material a differential feed movement; to the combination of parts whereby the machine may be used either as a matrix making machine or as a typewriter; to the key mechanism including, first, the connections between the keys and their corresponding dies; second, the means for insuring the complete action of a key whenever its movement is initiated, and the consequent correct action of all the parts which the depression of a key is intended to set in motion, and, third, the mechanism for returning the parts to their normal position; to the novel application of power to the several parts of the machine; to the details of construction of the different parts of the machine and to the combinations of parts which co-operate in producing the complete result aimed at and the different parts of said result, all of which will be presently explained and pointed out definitely in the claims.

Figure 4:
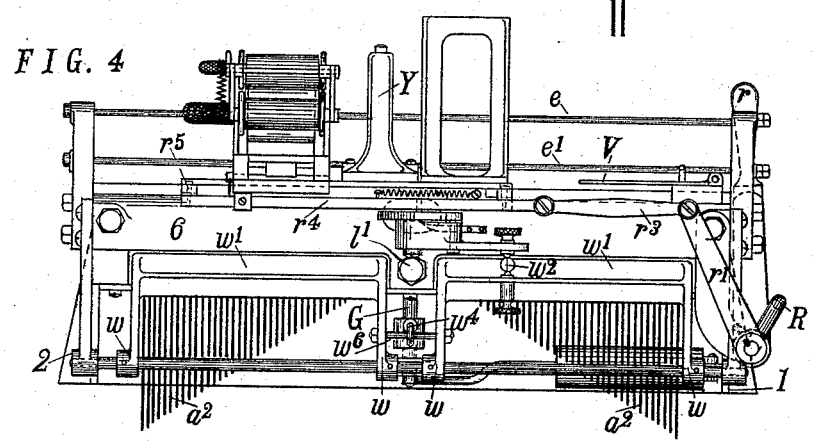
Figure 5:
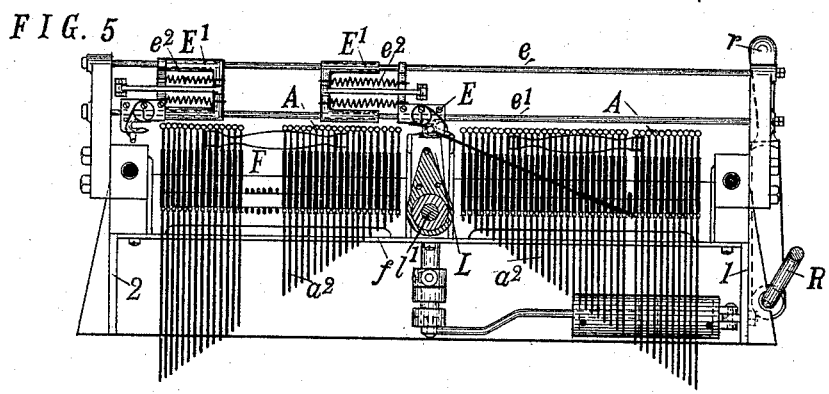

In the drawings, Figure 1 is a plan view of the complete machine. Fig. 2 is a longitudinal section on line 2—2 of Fig. 1. Fig. 3 is a side elevation. Fig. 4 is a rear elevation. Fig. 5 is a transverse section on line 5—5 of Fig. 1 looking from the rear. Fig. 6 is a perspective view of one of the slides which carry the die cases. Fig. 7 is a side view of one of the die cases. Fig. 8 is a perspective view of one of the dies. Figs. 9, 10, 11 and 12 are rear views of different dies, the one shown in Fig. 9 being from the right side, and the others from the left side of the machine. Fig. 13 is a plan view of one key and the mechanism with which its movements are related. Fig. 14 is a side view of the same parts. Fig. 15 is a side view of some of the same parts when the key is depressed. Fig. 16 is a perspective view of one of the die holding bars and a font of dies supported thereby. Fig. 17 is a front view of one of the shuttles, a die which has been carried to the impression point and the mechanism for stopping and holding it at said point. Fig. 18 is a side view of the parts shown in Fig. 17. Fig. 19 is a front view of one half of that part of the shuttle which engages with the die. Fig. 20 shows the curved locking finger $e^4$ in two positions. Fig. 21 is a perspective view of the mechanism, which engages with each die as it is brought to the impression point of the machine. Fig. 22 is a top view of the mechanism for operating the matrix carriage. Fig. 23 is a top view of one of the die holding bars F, when only two dies are supported thereby, one of which is shown at the impression point. Fig. 24 is a rear view of the same parts. Fig. 25 is a perspective view of the plate $i$ which retains the plunger in position. Fig. 26 is a side view of the driving mechanism of the machine and the mechanism for moving and holding the shuttles. Fig. 27 is a side view of the upper end of the lever $k^8$. Fig. 28 is a plan view of the parts shown in Fig. 27. Fig. 29 is a front view of the carriage and the parts carried thereby. Fig. 30 is a plan view of said parts. Fig. 31 is a side view of the paper carrier which serves either as the copy holder or as a part of the type-writing apparatus. Fig. 32 is a detached view of the pressure piece for holding the matrix. Fig. 33 is a bottom view thereof and Fig. 34 is a detail view of one of the pressure rollers which it carries.

All of the parts of the machine are supported by a rigid frame, which, in the form shown, is constructed as follows, to wit: with two side pieces 1 and 2 which are connected by a front brace 3 and a top plate 4. At the transverse center and near the rear edge of the top plate is portion 5 of the frame which extends both above and below the plane of the top plate and also rearward therefrom. This portion of the frame supports numerous parts of the operating mechanism, as will be presently explained. A back plate 6 is bolted to the sides 1 and 2 and to the portion 5, and its principal function is to support the carriage. Near the front edge of the top plate are the three posts 7, 8 and 9; and behind them and on opposite sides of the central line of the machine are the two posts 10 and 11. Preferably all of the parts of the frame above named, except plate 6, are cast in one piece.

At the front of the machine are the keys $b^3$ which are attached to the key levers B which are of equal length. At the rear of the machine is the transversely movable carriage U which supports the impression receiving material. Just in front of the carriage are the dies A which are arranged in a transverse row, with their characters facing rearward; and they are adapted to be carried separately to the transverse center or impression point of the machine. The mechanism for operating the shuttles by which the dies are moved is for most part mounted on the top plate; and said mechanism is operated by a spring motor also mounted on the top plate. The feed mechanism is placed below the plate 6 which supports the carriage, in position to be actuated by the projecting lugs on the die cases.

Having now described generally the relative positions of the several parts mainly concerned in the different movements of the machine, we will now describe the construction of these parts in detail.

The dies A are cylindrical pieces of steel, each of which is secured at or near its middle to the top of a shank which lies substantially at right angles to the die. We prefer to form the shank of two parallel spring wires $a'$ $a^2$. The shank passes through a normally vertical aperture in the case $a$, and it is adapted to slide freely to and fro in said case, but cannot turn therein. Each case is pivoted to the rear vertical edge of a slide $a^3$, by means of a cylindrical pin $a^4$ which is secured to the lower edge of the case and enters a hole in the slide. A coiled spring $a^5$ surrounds the pin and lies in a recess $a^6$ in the slide. One end of the spring is attached to the slide and one end to the pin $a^4$, and it exerts torsional force to turn the pin in its bearings and thereby bring and hold the case against a shoulder $a^7$ on the slide. On the shank wires are the shoulders $a^8$ which rest on the top edge of the case $a$ and thus uphold the dies at the proper elevation. In the die holding bar F are numerous horizontal grooves $f^4$ in which slides $a^3$ are movably supported. Two of these die holding bars F are employed, and each receives and supports half of the slides $a^3$ which are employed in the machine. These bars are supported on the cross bar $f$ which is secured to the frame. The ends of the bars F are guided between the vertical shoulders $f'$ $f^2$ on the sides 1 and 2 and on the part 5 of the frame. The bars may be removed by means of the handles $f^3$, and other bars substituted which carry dies having different styles of type.

The shanks of the dies preserve the connection of said dies with their respective cases while said dies are being moved to the impression point at the center of the machine. The shanks are of different lengths. The nearer to the center is the normal position of any die the shorter is its shank. It will also be noticed by reference to Figs. 9, 10, 11 and 12 that the characters on the several dies are inclined when the dies are in the line of dies and when, consequently, the die shanks are vertical, and that the farther the normal position of any die is from the center the greater is said inclination. The position of the characters on the several dies is such that when any die is at the impression point the character thereon is upright, as shown in Fig. 24.

A transverse cylindrical rod $b$ is attached at its ends to the brackets 12 which are secured to the sides 1 and 2 of the frame; and this bar passes through and serves as the fulcrum for the key levers B. These levers may be separated by washers $b'$ (Fig. 13) although it is not absolutely necessary becuse the rear ends of said levers are held in fixed position by their connection with the bell cranks C. A cylindrical rod $c$ is also supported at its ends by the sides of the machine. On this rod are hung the bell crank levers C which are made up of two separated thin plates $c'$ $c^2$ which are secured together and held in the proper relative position by the two pins $c^3$ $c^4$. The lower pin enters a substantially horizontal slot $b^2$ in the end of the key lever, and the end of said lever lies between the two plates $c'$ $c^2$. The upper pin enters a vertical slot $a^9$ in the under side of the corresponding slide $a^3$, which likewise lies between the two plates $c'$ $c^2$. When the key lever is depressed the corresponding bell crank C is rocked, and its upper end moved backward, thereby moving the slide $a^3$ backward such a distance that the die A which is carried by said slide is moved out of the line of dies so far that it may be moved transversely to the impression point without touching the other dies between it and said point.

Extending transversely across the machine in front of the key levers is a rock shaft $d$ which is journaled in brackets $d'$ which are attached to the sides of the frame. To this rock shaft four levers D D, D' D' are rigidly secured, two near its ends and two near the transverse center of the machine. A bar $d^3$ is secured rigidly to the two levers D D on one side of the center of the machine; and it lies beneath and in contact with all the key levers on said side of the machine. Another bar $d^3$ is rigidly secured to the two levers D' D' on the other side of the machine in line with the first named bar $d^3$, and it lies beneath and in contact with all the key levers on that side.

$d^4\ d^4$ represent two bars which are arranged in line in front of the front ends of the key levers, and they are rigidly connected with the levers D D and D' D' respectively. When any key lever is pressed down it moves down the bar $d^3$ beneath it, whereby the rock shaft $d$ is rocked and the bars $d^4$ are moved beneath the ends of the other key levers. At the same time one of the bars $d^4$ passes over the end of the depressed key lever. The front ends of the key levers are pointed and curved to permit this action as shown in Figs. 14 and 15.

Pivoted to the sides of the frame adjacent to the levers D D' are the bell crank levers H. The substantially horizontal arm of each bell crank is provided with a slot $h$, into which extends a pin $d^5$ projecting from the adjacent lever D or D'. The other arm of said bell crank extends downward, and to it is attached one end of a contractile coil spring $h'$. The other end of said spring is attached to the top plate 4 of the frame at a point where, normally, the force of the spring is exerted through the pivotal line of said bell crank. One effect of depressing a key lever is to rock the rock shaft $d$ as before explained. This moves all of the levers D D', which in their movement, by the connections above described, rock the bell cranks H. The lower ends of the springs $h'$ are thereby moved backward until their force is no longer exerted through the pivotal line of the bell crank levers H, but to one side thereof, whereby these springs exert their force to move the bell cranks still farther in the same direction. This movement of the bell cranks moves the levers D D'. The bar $d^4$, which has been moved over the end of the depressed key, presses on said key and compels it to move downward the complete distance provided for—that is to say, if the operator initiates the movement of a key, the mechanism above described compels the key to complete its movement, and holds it down until all of the movements of other parts of the machine which the depression of the key initiates have been completed. At the same time the depression of any other key is prevented by bars $d^3$ until the depressed key is returned to its normal position.

The key is returned by means of a rod J, the forward end of which lies between and is pivotally connected with the two middle levers D D'. Its rear end is connected with a plate $j$ having a slot $j'$ through which the main shaft G of the machine passes. This plate rests on a collar $g$ rigidly secured to said shaft, and a cam $g'$ on said collar is so placed that as the shaft revolves this cam will engage with a lug $j^2$ on the under side of the plate $j$ and move said plate forward. The lug $j^2$ and cam $g'$ are so placed relatively that the cam does not obstruct the backward movement of the bar when the shaft is at rest. When the bar $j$ is moved forward the rod J rocks the levers D D' and the bar $d^3$ lifts the depressed key.

At the rear end of the machine is a transversely movable carriage, which carries the impression receiving material. At the transverse center of the machine a longitudinally movable plunger I is mounted in a groove in the top of the portion 5 of the frame. A cap plate $i$ is screwed on to the part 5, and the plunger is held in place by this cap. A contractile coil spring $i'$ is connected at its ends respectively with a pin $i^2$ on the plunger, and with said cap plate, which spring withdraws the plunger after it has been removed to make an impression of the die behind it.

Between the carriage and the dies are the two guide rods $e\ e'$ preferably made of spring steel placed one above the other, extending transversely across the machine passing through the sides of the frame. These rods may be tightened or loosened as occasion requires by means of bolts which screw onto their ends. Mounted on these guide rods are two shuttles,—one for each side of the machine. Each of these shuttles is adapted to move from the side at which it is normally held to the center of the machine, and back again, and one of them does so move every time a key is depressed. In so moving it carries with it the die which has been moved out of the line by the before described action of the key, to the impression point directly behind the plunger I.

Each shuttle is composed of two parts E E'. The part E' which is nearest the center of the machine and which we shall term the inner part, is the part to which the power is applied to move the shuttle. The other part E (hereinafter called the outer part) is that part which grasps and holds the die, thereby carrying said die with it to the impression point in line with the plunger I and then back again to its normal position. These two parts are connected by two contractile coil springs $e^2\ e^2$, whereby, when the inner part E' is moved toward the center of the machine, the outer part E is dragged after it by means of the said springs. The outer part E is composed of two plates $e^8\ e^9$ having between them a groove in which the rod $e'$ lies, and an arm $e^{10}$ which is rigidly connected with one of said plates and which has a hole in its upper end in which the rod $e$ lies. The two plates hang below the rod $e'$ and in this depending part of the shuttle is a horizontal slot $e^3$, open toward the center of the machine. The dies A are cylindrical and the end of the slot $e^3$ is curved to fit these dies. A curved locking finger $e^4$ is mounted in a correspondingly curved groove at the end of the slot $e^3$ between the two plates $e^8\ e^9$ and a tail $e^5$ on said finger projects normally downward from between the two plates. When this tail stands vertically, a die may enter the slot $e^3$ and the curved finger offers no impediment to its entry or exit. If, however, the finger is moved so that the tail thereon is moved toward a horizontal position, as shown in Fig. 16, the said curved finger embraces the die and prevents its removal from the slot in the shuttle. Projecting from both sides of the finger is a pin $e^6$, which is adapted to engage with the shanks of the dies for the purpose to be presently explained.

Fastened to the inner part E' of the shuttle is a spring catch $e^7$ which automatically engages with a fixed projection 15 at the side of the frame, and thereby the shuttle is held at the side of the frame until this spring catch is released. The spring catch is released whenever a key is depressed by the following mechanism: Pivoted to a stationary part of framework and on each side of the machine are the rock shafts K K', to each of which are attached two horizontal arms $k$ $k'$. From these arms hang the links $k^2$ $k^3$, the lower ends of which are connected by a bar $k^4$ which lies over the rear ends of all the keys on the same side of the machine. One of the links lies between two pins $k^5$ $k^5$, which project from the side of the frame, by which the said links are guided and caused to move substantially vertically when they move at all. Secured to the rock shaft K and extending downwardly therefrom is a second arm $k^6$ which is connected by means of a link $k^7$ with a pivoted lever $k^8$, the upper end of which lies behind the end of the spring catch $e^7$ before referred to. The same parts are found on the opposite side of the machine connected with rock shaft K'. The bar $k^4$ is at some little distance above the key levers, whereby said key levers may be moved a considerable part of their throw before they engage with said bar. When they do engage with it, they move it upward, thereby rocking the rock shaft K, or K' as the case may be, and through the connections above described, moving the lever $k^8$, thereby causing the withdrawal of the spring catch on that side of the machine. This releases the corresponding shuttle which is immediately moved toward the center of the machine. In its movement, the slot $e^3$ above referred to slips over the die which has been projected by the movement of the key, the part of the shuttle in which said slot is formed entering between the two shanks of the die; and said die is carried with and by the shuttle toward the center of the machine, the die case turning upon its pivot during the operation as shown in Figs. 23 and 24. As the die moves toward the center, the shanks thereof become more and more inclined to the vertical. These shanks strike against the pin $e^6$ projecting from the tail $e^5$ of the curved finger $e^4$, and said tail is thereby moved out of the vertical position, said finger revolving in its groove, whereby it locks the die in the shuttle. When the die reaches the center of the machine, it is caught in the curved slots $l, l$, of the two connected arms L L' which are pivoted on bolt $l'$ to the frame. These two arms are so far separated that the shuttle passes between them and one of them engages with the die between the shank $a'$ and the head end of the die, and the other between the shank $a^2$ and other end of said die as shown in Fig. 18. The arms L L' then swing until they strike the stops or shoulders $l^2$ $l^2$ on the fixed plates $l^3$ $l^3$ between which the arms L L' lie; and when at this point the die is at the impression point, and it is moved forward by the plunger I, to make an impression either in matrix material, or on paper or other like material. When the die is moved by the plunger, the shuttle is moved with it, the spring guide rods $e$ $e'$ being bent backward by said movement. When the plunger moves out of the way the spring rods $e$ $e'$, move the shuttle forward and thereby withdraws the die. While the plunger is moving forward and backward to make this impression and to get out of the way of the die, the inner part E' of the shuttle, to which the power to move it is applied, continues its movement for half an inch, more or less, the springs $e^2$ $e^2$ expanding during this movement. This portion of the shuttle then begins its backward movement and strikes the part E of the shuttle, which it pushes before it, back to its original position. The interval of time during which the front part of the shuttle is moving forward and backward independently of the rear part, is sufficient for the impression of the die to be made by the movement of the plunger.

The shuttles are moved respectively by the levers M M' which are pivoted at their front ends on the top of the posts 7 and 9. The rear ends of the levers M M' are connected respectively by means of the links $m^2$ $m^3$ with inner parts E' of the two shuttles. A narrow horizontal guide bar $n$ is fixed to the post 8 and to a lug $i^3$ on top of cap plate $i$. A slide N surrounds and is guided by said bar $n$. On the under side of the slide N is a cross bar $n'$ having a transverse groove $n^2$. To the top side of the slide N a plate O is pivoted extending forward from its pivotal point. A link $m$ connects one side of the front end of this plate with the lever M, and a similar link $m'$ connects the other side of said plate O with the lever M'. The connections between the ends of the links $m$ $m'$ and both the plate O and the levers M M' are adjustable; the pivots thereof being adjustable in slots in said plate O and levers M M'. When the slide N is moved toward the front of the machine, and the shuttle on one side, (say the right side) of the machine is held in its normal position and the shuttle on the left side of the machine is released, the last named shuttle is moved toward the center of the machine by the following action of the parts. The pivot $m^5$ of the link $m'$ in the lever M' on the right side of the machine is the fixed point by which this movement is controlled. By the forward movement of the slide N the plate O is likewise moved forward, and at the same time said plate is drawn toward the right of the machine, on which this fixed pivot $m^5$ is located, the link $m'$ moving about said fixed point $m^5$ as a center. The plate O in moving toward the right side of the machine causes the lever M to swing on its pivot on the post 7, thereby, as above stated, moving the shuttle toward the center of the machine, as shown in Fig. 20. When the slide N is moved backward the parts reverse their movement and return to the position shown in Fig. 1. When the shuttle has reached the side of the machine the spring catch $e^7$ engages with the fixed projection 15, thereby holding the shuttle until again released.

The forward and backward movement of the slide N is occasioned by means of pin $g^3$ which projects upward from a crank $g^4$ into a transverse groove $n^2$ in the cross bar $n'$; and as this crank is revolved, the slide N is necessarily moved forward and backward. The said crank $g^4$ is attached to a vertical shaft G to which a constant force is applied tending to revolve it. Its continuous revolution is prevented by the catches $e^7$ holding the levers M M' stationary as described. The motor shown in the drawings for revolving the shaft G consists of a pinion $g^6$ secured to the shaft G; a gear $t$ secured to shaft T meshing the said pinion $g^6$; a pinion $t'$ secured to the shaft T, and a gear $t^2$ meshing with said pinion $t'$. The said gear $t^2$ is formed on the outside of a spring barrel which is revolved by a spring S. Secured to the shaft G is a quick acting cam $g^7$, which engages with the end of the plunger I and moves it forward sharply against the end of a die, to cause the impression movement of said die. This cam comes into action at the time when the slide N is nearest the front of the machine, which is, consequently, at the same time that the shuttle has carried the die to the impression point. As before stated, this cam acts upon the plunger to move it forward and then gets out of the way so that the plunger may move backward in that interval of time during which the inner part E' of the shuttle is moving forward and back independently of the outer part E.

The carriage U is a plate which is mounted on the top horizontal side of the plate 6 of frame of the machine, a transverse tongue on the plate 6 entering a groove in the under side of the carriage whereby the latter is guided. Projecting downward from the rear edge of the carriage is a plate $u$, in the front edge of which a rack $u'$ is formed. Engaging with the rack is a pinion $u^2$ pivoted on a vertical stud $u^3$, which stud is screwed into the under side of the plate 6. Secured to the pinion is a ratchet wheel $u^4$. Pivoted concentrically with the ratchet wheel is a lever $u^5$ which carries a spring pawl $u^6$ which is held in engagement with said ratchet wheel $u^4$ by the spring $u^7$. A transverse rock shaft W is mounted on the frame of the machine below the carriage. To it are rigidly secured two upwardly projecting arms $w\,w$, having their ends connected by bars $w'\,w'$, which are secured to said arms and extend across the machine just in front of the projections $a^{10}$ on the die cases. These bars $w'\,w'$ are connected by means of a universal link $w^2$ with the lever $u^5$; so that when said bars $w'\,w'$ are moved backward, they cause, through the said connecting link, a backward movement of the lever $u^5$ whereby the pawl $u^6$ slides backward on the ratchet a number of teeth corresponding with the amount of movement of said lever. When the said bars $w'\,w'$ are returned to their normal position, they draw the lever $u^5$ with them. In this movement the pawl engages with the ratchet teeth, thereby revolving it and the pinion $u^2$ and causing a movement of the carriage the greater or less according as the described backward movement of said lever $u^5$ has been greater or less. This constitutes the feeding of the carriage.

The movement of the carriage takes place immediately after the impression of the die is made, and, since one of the uses of the machine is to make a matrix in which a linotype may be cast which shall simulate a line formed of type set by hand, it is necessary to have a differential feed; that is to say, that the carriage shall be moved after each impression distances proportionate to the width of the letter of which the impression has been made. To secure this result, a stud $a^{10}$ projects rearward from each die case. The length of these studs is proportionate to the width of the letter on the dies. The longest studs, which will be on the cases which carry the widest letters, almost touch one of the bars $w'\,w'$ when in their normal position. The narrower the letter the shorter the stud on the corresponding die case, and consequently the greater the distance normally between the end of the said stud and said bar. As before explained, every die case is moved by the movement of its slide the same distance rearward as every other die case is moved. It therefore follows that the longer the stud the greater will be the movement of the bars $w'\,w'$ and of the lever $u^5$, and consequently the greater will be the movement of the ratchet wheel occasioned by the return movement of the said lever. This return movement of the bars $w'\,w'$ to their normal position is occasioned by a rod $w^4$ having a hook $w^5$ which engages with a pin $w^6$ fastened to the two middle arms $w\,w$ to which said bars $w'\,w'$ are attached. This rod is secured to the slotted plate J which, as before stated, is returned to its normal position by the operation of the cam $g'$; and in returning to this position the hook on the end of the rod $w^4$ likewise returns the levers $w\,w$ and the bars $w'\,w'$ which they carry, to their normal positions.

This machine is intended especially for making impressions in wood blocks. A hopper 40 containing a supply of blocks is mounted on the carriage U. Mounted on the carriage adjacent to the hopper is a standard Y having ears $y$ $y$ through which a vertically movable rod $y'$ passes. A coil spring $y^2$ surrounds this rod and presses against the upper ear and against a collar $y^3$ on the rod. To the lower end of the rod is secured a pressure block $y^4$ in which are mounted a series of rollers $y^5$ having their peripheries threaded and also fluted longitudinally. A push bar V fixed to the frame is adapted to enter a slot in the lower end of the hopper, and when the carriage is moved to the left it so enters said hopper and pushes the lower matrix out through a slot therein and underneath the rollers $y^5$ in the pressure piece above described; and this matrix in turn pushes the matrix in which the impressions have just been made out from under said pressure piece. The surface of the rollers is formed in the described manner so that the wood block in passing under them will be caused to slide backward against the standard Y.

Journaled to the left side of the frame is a rock shaft R, having at some convenient point an operating handle $r$. At the rear end of this rock shaft an arm $r'$ is rigidly secured. It projects upward and its upper end is connected by means of a link $r^3$ with a bar $r^4$. This bar is connected with the rear edge of the carriage by two parallel links $r^5$. A shoulder $r^6$ on the carriage is adapted to be engaged by one of said parallel links and a contractile coil spring $r^7$ which, connected at its ends with said carriage and bar $r^4$, exerts its force to so move the bar $r^4$ that said link is brought into engagement with said shoulder $r^6$. The bar $r^4$ lies just behind and close to a pin $u^8$ on the pawl $u^6$. When one of the links $r^5$ is in contact with the shoulder $r^6$, the bar $r^4$ is at its greatest distance from the said pin and does not touch the same, and the parts are in this position when by the operation of lever $r$ the carriage is moved to the left; but when the lever $r$ is moved toward the right, it moves the bars $r^4$, which in its movement presses on the pin on the end of the pawl and lifts the pawl out of engagement with the feed ratchet.

The purpose and mode of operation of the above described mechanism are as follows: When a matrix has been completed, the handle $r$ is moved to the left. This causes the carriage to be moved toward the left to the end of its path when it strikes the stop U which stops it. During this movement the plate V has entered the end of the hopper and pushed a matrix block out of the hopper and under the matrix holder where it is ready to be operated on by the dies, the matrix which has just been formed having been forced from under said holder as before explained. The handle $r$ is then moved to the right. The first effect of this movement is to move bar $r^4$ to the right, which bar in so moving moves toward and against the pin $u^8$ in the pawl $u^6$ which is thereby lifted from engagement with the ratchet. The ratchet wheel may then be revolved freely as the carriage is moved back to the right side of the machine. The continued movement of the handle $r$ to the right causes the carriage to be moved to the right and to the starting point.

The paper holding device is most clearly shown in Figs. 29, 30 and 31. A base 20 is pivoted to two ears $u^9$ on the carriage U. To it are secured two sides 21, 21. A rock shaft 22 is journaled in the upper ends of said sides. A roll 23 is journaled to said sides; and two triangular plates 24 are secured to said rock shaft. To these two plates are journaled the two paper rolls 25, 27. On the side of one of the plates 24 is a projection 29 against which the lever 27 is adapted to engage, the lever being pivoted on said rock shaft. A coil spring 28 is secured at its ends to one of the sides and to the lever 27. When the parts are in the position shown in Fig. 31, the spring 28, acting on the lever 27, causes it to press against the projection 29 whereby the roll 25 is held in engagement with the roll 23. If, when the parts are in this position, the roll 23 is turned by means of the finger piece $23^a$, the roll 25 will be revolved. If the lever 27 is thrown over to the right until it strikes the other side of the projection 29 the roll 26 is thrown into contact with the roll 23, the latter roll being covered with sand paper or other like material. The paper 30 is wound around roll 26, passes down under the base, up over its front edge, over roll 23 and around roll 25.

If it is desired to use the machine for a type-writer to print on the paper the base 20 is allowed to swing down until it rests on the carriage in a recess in the top side thereof. The front edge of the base will then be in the proper point to serve as a platen against which the paper rests when impressions thereon are being made.

A lever 31 which is pivoted to an arm 32 extending rearward from the base, engages on top of an arm 33 projecting rearward from the carriage, and thereby holds the base down in the position referred to.

In a recess on the under side of the base are two ribbon rolls 34, and the ink ribbon which is wound on said rolls, passes horizontally over the front edge of the base outside of the paper, being held out of actual contact with said paper while being held in proper position over the same by the grooved projecting corners 35 of said base.

The machine may, by reason of its adaptability to use as a type-writer be employed to print the copy which is to be followed in making the matrices; and if the copy be prepared with no lines longer than the standard length of the linotype required, it will assist an operator, who is making matrices on the machine, to justify his line by the method set forth in a pending application of Charles Sears, Serial No. 440,359, filed July 18, 1892.

When the paper holding device is being used as a copy holder, the base of the holding device is raised, and upheld by the engagement of the said lever 31 below the arm 33. A slide 36 is now pushed into an appropriate groove in the carriage, so as to cover the depression therein into which the base 20 projected when in the other position. This is done so that the matrix blocks as they are completed and pushed out from under the pressure piece $y^4$, may have a smooth surface to slide on across the carriage to the right. A slotted plate 37 is secured to the frame of the machine in a position to lie in front of the copy when a matrix is being made. The copy is seen through the slot. This plate is not a part of the present invention. It and its functions are fully described in the prior application, Serial No. 440,359 before mentioned.

Having described our invention, we claim—

1. In a matrix-making machine, in combination, a font of dies arranged in line facing the plane of the impression receiving material and adapted to be projected severally out of the line, a transversely movable shuttle adapted to grasp the projected die and to carry it to the impression point and to return it to the point from which it was taken, mechanism for actuating the shuttle, a device for holding the impression receiving material, mechanism for moving the dies severally as they arrive at the impression point against said material, a series of keys corresponding with the dies, and intermediate mechanism whereby the actuation of any finger key projects the coresponding die out of the line of dies and releases the shuttle to the influence of the shuttle actuating mechanism, substantially as specified.

2. In a matrix-making machine, in combination, a font of substantially horizontal dies arranged in line facing the carriage way, a series of corresponding finger keys, intermediate mechanism whereby the operation of each finger key projects its corresponding die out of the line of dies, a shuttle and its operating mechanism adapted to grasp the projected die and carry it to the impression point and to return it, a movable carriage and a device for moving the dies as they are severally brought to the impression point against the impression receiving material, substantially as specified.

3. In a matrix-making machine, in combination, a die having the character on its end, a shank secured to said die substantially at right angles to said die, a case having an aperture in which said shank slides freely, and means for preventing the revolution of said shank in said aperture, substantially as and for the purpose specified.

4. In a matrix-making machine, in combination, a shank, a die secured by its side to the top of said shank, said die having on its end a character which is set at an inclination to the plane of the shank with a pivoted case having an aperture in which said shank slides freely, and means for preventing the revolution of said shank in said aperture, substantially as and for the purpose specified.

5. In a matrix-making machine, in combination, a die having the character on its end, two substantially parallel wires secured to the side of said die and at right angles thereto and shoulders on said wires, substantially as and for the purpose specified.

6. In a matrix-making machine, in combination, a bar F having guides, a series of slides movable through said bar, and independently movable dies carried by said slides respectively, substantially as and for the purpose specified.

7. In a matrix-making machine, in combination, a removable bar F, and means for supporting the same in the machine, of a series of slides movable through said bar, and independently movable dies supported on said slides respectively, substantially as and for the purpose specified.

8. In a matrix-making machine, in combination, a bar F, a series of slides mounted in said bar, dies carried by said slides and standing normally in line with each other, a series of corresponding key levers, and intermediate mechanisms connecting the key levers with corresponding slides, whereby the movement of a key lever operates its corresponding slide.

9. In a matrix-making machine, in combination, a pivoted key lever, a bell crank lever, a slide, a die case pivoted to said slide, a die having a shank which is slidable through said case, and mechanism connecting the two arms of the bell crank lever with the key lever and slide respectively, substantially as and for the purpose specified.

10. In a matrix-making machine, in combination, a slide $a^3$, a die case $a$ pivoted thereto, a spring adapted to return the die case to its normal position and a die having a shank which is slidable through said die case, substantially as and for the purpose specified.

11. In a matrix-making machine, in combination, the slide $a^3$ having a shoulder $a^7$, a die case pivoted at its lower end to the face of said slide and having a substantially vertical hole passing through it, a die having a character on its end and a shank secured to said die at substantially right angles thereto which is slidable in the hole in said die case, substantially as and for the purpose specified.

12. In a matrix-making machine in combination, a series of transversely movable dies arranged in a line, mechanism for projecting said dies separately out of the line, and a transversely movable shuttle adapted to grasp the projected die and carry it to the impression point and back again, substantially as and for the purpose specified.

13. In a matrix-making machine, in combination, transverse guides, a shuttle movable thereon from one side of the machine to the impression point and back again, mechanism for imparting to the shuttle said movement, a spring catch adapted to hold said shuttle at the side of the machine, and mechanism for releasing said catch, substantially as and for the purpose specified.

14. In a matrix-making machine, in combination, a shuttle movable from one side of the machine to the impression point, a catch for holding it at the side, a lever connected with said shuttle adapted to operate it, a motor, and mechanism connecting said motor and lever, substantially as and for the purpose specified.

15. In a matrix-making machine, in combination, two shuttles, catches for holding them respectively at the side of the machine, two levers adapted to move said shuttles to and from the impression point, a motor and mechanism connecting said motor and levers, whereby either of said levers is operated when its corresponding shuttle is released, substantially as and for the purpose specified.

16. In a matrix-making machine, in combination, a transversely movable shuttle, a catch for holding it at one side of the machine, a series of key levers, a bar lying above the ends of said levers and mechanism connecting said bar and catch whereby the operation of any lever releases the catch, substantially as and for the purpose specified.

17. In a matrix-making machine, in combination, a longitudinally movable slide, a plate pivoted thereto, two shuttle operating levers, links connecting said plate and the said levers, and means for actuating said slide, substantially as and for the purpose specified.

18. In a matrix-making machine, in combination, shuttle guides, two shuttles movable thereon and catches for holding said shuttles at the respective sides of the machine, a longitudinally movable slide N having a transverse groove, a driving shaft, a crank arm and its pin, the latter lying in the groove aforesaid, a plate O pivoted to said slide, two levers pivoted to fixed supports on opposite sides of said slide, and connected at their free ends to the shuttles, and links connecting said levers respectively with said plate O, substantially as and for the purpose specified.

19. In a matrix-making machine, in combination, a transverse guide, a movable shuttle mounted thereon composed of two parts, springs connecting them, mechanism connected with the part nearer the center of the machine whereby the said shuttle is moved from the side toward the center of the machine and back again, a device on the other part of the shuttle adapted to grasp a die, and a stop near the center of the machine for stopping the forward movement of the rear part of the shuttle, substantially as and for the purpose specified.

20. In a matrix-making machine, in combination, a shuttle composed of two parts E E' springs connecting them, the part E having a horizontal slot open toward the center of the machine, and mechanism connected with the forward part adapted to move the said shuttle, substantially as and for the purpose specified.

21. In a matrix-making machine, in combination, a shuttle having a depending arm in which is formed a horizontal slot, and a locking device for holding a die in said slot, substantially as and for the purpose specified.

22. In a matrix-making machine, in combination, a shuttle having a depending arm in which a slot is formed, a curved locking finger lying in a curved groove at the end of said slot, having a tail which extends downward therefrom, substantially as and for the purpose specified.

23. In a matrix-making machine, in combination, the spring bar $e'$, a shuttle movable on said bar as a guide, transversely movable dies adapted to be grasped by said shuttle and carried to the impression point, and a plunger adapted to force said die against the impression receiving material, substantially as and for the purpose specified.

24. In a matrix-making machine, in combination, a transversely movable shuttle, its operating mechanism, a catch for holding it at one side of the machine, a series of key levers, a rock shaft, arms secured thereto, links depending therefrom, a bar secured to said links over the ends of said levers, an arm secured to said rock shaft, a lever adapted to release said catch, and a link connecting said lever and arm, substantially as and for the purpose specified.

25. In a matrix-making machine, in combination, independently movable dies, a shuttle adapted to grasp the dies severally and carry them to the impression point, two connected pivoted plates L L' having slots $l\ l$, and the stops $l^2\ l^2$, substantially as and for the purpose specified.

26. In a matrix-making machine, in combination, independently movable dies, two shuttles each transversely movable from one side toward the center and adapted to grasp and carry the dies severally to the impression points, two plates L L' having in opposite sides the slots $l\ l$, and the stops $l^2\ l^2$, substantially as and for the purpose specified.

27. In a matrix-making machine, in combination, a series of slides, a series of corresponding finger keys, and intermediate mechanism, independently movable dies carried by said slides, studs $a^{10}$, projecting from said slides which studs are relatively of lengths which are proportionate to the width of the characters on the dies, and matrix feeding mechanism in line with said studs and adapted to be moved thereby, substantially as and for the purpose specified.

28. In a matrix-making machine, in combination, a series of slides, die cases pivoted to said slides respectively, independently movable dies carried by each die case, studs projecting from each die case matrix feeding mechanism adapted to be operated by said studs, substantially as and for the purpose specified.

29. In a matrix-making machine, in combination, a laterally movable carriage adapted to hold the impression receiving material and having a rack $u'$, a pinion $u^2$ and ratchet wheel $u^4$, an arm $u^5$ pivoted concentrically with said ratchet wheel a spring pawl carried on said arm, a series of slides which support the dies, studs projecting rearward from said slides, a rock shaft, a bar connected therewith, lying behind all of said studs, and mechanism connecting said bar with the arm $u^5$, substantially as and for the purpose specified.

30. In a matrix-making machine, the combination of a transversely movable carriage having a rack, a pinion engaging with said rack, a ratchet wheel connected with said pinion, a pivoted lever carrying a spring pawl adapted to engage with said ratchet, a font of dies adapted to be moved severally to the impression point, a feed bar adapted to be moved backward by the movement of the dies, mechanism connecting the feed bar with the pawl-carrying lever, the driving shaft, a cam on the same, a plate adapted to be operated by said cam and mechanism connecting said plate and feed bar, substantially as and for the purpose specified.

31. In a matrix-making machine, in combination, a transversely movable carriage having a rack, a pinion, a ratchet secured thereto, a pivoted arm and means for operating it, a spring pawl carried by said arm engaging with said ratchet, a bar connected by means of two parallel links with said carriage, and adapted to engage with said pawl, a rock shaft and suitable connecting mechanism between said bar and rock shaft, substantially as and for the purpose specified.

32. In a matrix-making machine, in combination, a transversely movable carriage, a spring actuated pressure piece adapted to hold a matrix block, a hopper for containing a supply of blocks both mounted on said carriage, and a fixed plate adapted to enter said carriage as the latter is moved to the left and to push the lowest matrix out of said hopper and under the pressure piece, substantially as and for the purpose specified.

33. In a matrix-making machine, in combination, a series of key levers having curved pointed front ends, a rock shaft two levers D D secured to said rock shaft at the sides of the series of levers, a bar $d^3$ secured to said levers D D lying beneath and in contact with all of said key levers a bar $d^4$ lying in front of all the ends of said levers, whereby the depression of any key lever rocks the levers D D and causes the bar $d^4$ to move over the depressed key and under all of the other keys, substantially as and for the purpose specified.

34. In a matrix-making machine, in combination, a series of key levers, two levers pivoted at the sides of the series, two bars secured to said levers one lying in front of the ends, and one beneath and in contact with all of said key levers, and a spring adapted to compel the complete movement of said levers when the movement has been initiated by the depression of a key, substantially as and for the purpose specified.

35. In a matrix-making machine, in combination, a series of key levers, a rock shaft, two levers secured thereto at the sides of the series, the bar connected to said levers lying beneath and in contact with the under sides of said key levers, the bell crank lever suitable connections between it and one of the levers D, and a spring connected with one arm of the bell crank and exerting its force normally in a line which passes through the pivot of said bell crank, substantially as and for the purpose specified.

36. In a matrix-making machine, the combination of a series of key levers, a rock shaft two levers D D secured to said rock shaft at the sides of the series of key levers, a bar $d^3$ secured to said levers D D lying beneath and in contact with all of said key levers, a bar $d^4$ lying in front of the ends of all the key levers, a driving shaft a cam secured thereto, a plate adapted to be operated by said cam, and a rod connecting said plate and one of the levers D, substantially as and for the purpose specified.

37. In a combined matrix-making machine and type-writer, the combination of a transversely movable carriage, with a device for holding a matrix block and a paper holding device both mounted on said carriage, means for moving the carriage to a position whereby either the matrix block held by the one or the paper carried by the other of said devices shall receive the impression of the dies, and mechanism for imparting to the carriage a step by step feed movement, substantially as and for the purpose specified.

38. In a combined matrix-making machine and type-writer, the combination of a series of dies, a series of corresponding finger keys and connecting mechanism whereby the dies may be severally brought to the impression point and an impression thereof made on the impression receiving material, with a transversely movable carriage, a device for holding a matrix block, and a device for holding paper, both mounted on said carriage whereby either the matrix block or paper may be brought to the position to receive the impressions from the dies, and differential feed mechanism for moving the carriage distances proportionate to the widths of the several dies, substantially as and for the purpose specified.

39. In a combined matrix-making machine and type-writer, the combination of a transversely movable carriage having a recess in its front edge, with a paper carrying frame pivoted to said carriage at a point where its front edge is adapted to set into said recess, mechanism for holding the paper carrying frame both in and out of said depression, and a plate adapted to cover said depression, substantially as and for the purpose specified.

In testimony whereof we affix our signatures in presence of two witnesses.

CHARLES SEARS.
FRANK MILLER.

Witnesses:
L. F. GRISWOLD,
E. L. THURSTON.